United States Patent [19]
Schlies et al.

[11] 3,760,791
[45] Sept. 25, 1973

[54] APPARATUS FOR HEATING A PRESSURIZED GAS

[75] Inventors: Edward L. Schlies; Harrison Weaver; John W. Haun; Dwight L. Hensel, all of Brillion, Wis.

[73] Assignee: Beatrice Foods Co., Chicago, Ill.

[22] Filed: Feb. 24, 1972

[21] Appl. No.: 228,944

[52] U.S. Cl. .............................. 126/110 R, 236/46
[51] Int. Cl. ........................................... F24h 3/10
[58] Field of Search ................ 126/110 AA, 110 R, 126/109; 236/10, 46

[56] References Cited
UNITED STATES PATENTS
1,558,848  10/1925  Doble, Jr. ................... 126/110 AA
1,919,743  7/1933   Peters ................................ 236/10

Primary Examiner—William E. Wayner
Assistant Examiner—W. E. Tapolcai, Jr.
Attorney—John W. Michael et al.

[57] ABSTRACT

The heater includes a heat exchanger, a pressure control system and a heater. Pressurized gas (e.g. compressed air), the flow of which is regulated and controlled by the pressure control system, flows through an elongated, annular passage inside the heat exchanger between an elongated, tubular shell and a heating member which is heated by the heater (e.g. a concentric, elongated tubular flue through which hot combustion gases from a gas burner flow). The gas is heated as it flows in contact with the heated surface of the heating member.

The pressure control system automatically sequences the regulations of the flow of pressurized gas introduced into the heat exchanger so that the flow of heated gas delivered by the heater is initially at a relatively low volume and, after a predetermined time, is at a higher volume. A low volume bleed, continuously flowing through the annular passage while the heater is operating, prevents overheating of the heating member and keeps the heat exchanger and hardware connected thereto warm between heating cycles, thereby minimizing warm up time at the start of a heating cycle.

The heater is particularly adaptable for use in curing cores or molds made from moistened sand and a thermosetting binder material where rapid heat curing is desired, without the eroding effect of an initial high pressure gas flowing therethrough prior to curing of the binder.

9 Claims, 2 Drawing Figures

APPARATUS FOR HEATING A PRESSURIZED GAS

BACKGROUND OF THE INVENTION

This invention relates to heating apparatus and, more particularly, to apparatus for heating a pressurized gas.

Cores and molds made from sand bound together with a binder material are widely used in the foundry industry. Typically, these cores or molds are made by mixing the binder material with moist sand, introducing this mixture under pressure into a mold and baking the thus-molded core or mold to remove the moisture and set the binder.

Recently, organic thermosetting materials have been developed as binders for this use. These thermosetting materials, which are mixed with the sand in an uncured form, are cured to a hardened form by the application of heat. In order to obtain a uniform heating of the core or mold (thus uniform curing of the thermosetting material) within a reasonably short period of time, it is desirable to circulate a heated gas, such as air, over and/or through the core or mold, preferably prior to its removal from the forming mold. If the heated gas is at a relatively high velocity and pressure, the thermosetting material is more rapidly cured, thereby permitting higher production rates. However, freshly formed cores or molds are very vulnerable to erosion from high velocity gases prior to the time the binder is at least partially cured.

Between heating cycles, a finite amount of heat is required to heat up the hardware directing the heated air from the heating means to the core forming boxes if it is allowed to cool off between heating cycles. The time required for this warm up to take place can represent a limitation on production rate capacity, especially where a single heater is manifolded into a bank of core boxes.

SUMMARY OF THE INVENTION

An object of this invention is to provide a simple heating means which is capable of heating a pressurized gas and delivering the heated gas in a manner to rapidly cure core or molds made from sand and an organic thermosetting binder material without causing erosion of the cores or molds.

Another object of this invention is to provide apparatus for efficiently heating a pressurized gas which is capable automatically sequencing the volume of heated gas delivered thereby to different levels.

A further object of this invention is to provide such a heating means which is arranged to minimize warm up time at the start of each heating cycle.

The heater of this invention includes a heat exchanger wherein the pressurized gas (e.g. compressed air) is heated, a pressure control system which regulates the volume and controls the flow of pressurized gas supplied to the heat exchanger, and a heating means. The heat exchanger has an elongated, tubular shell and a heating member, which is heated by the heating means and is positioned with respect to the shell so that a flow passage is provided therebetween. Preferably, the heating member is an elongated, tubular flue which is concentric with the shell and the heating means is a burner means producing hot combustion gases which flow through the flue to heat the surfaces thereof. The pressurized gas is heated as it flows through the annular passage and passes in contact with the heated surface of the heating member.

The pressure control system includes means for automatically sequencing the regulation of the flow of pressuirzed gas introduced into the heat exchanger so that the heated gas delivered by the heater is initially at a low volume and, after a predetermined time, is at a higher volume. When the heater is used for curing a sand core or mold containing an organic thermosetting binder material, the initial flow of heated gas delivered by the heater passes through the core or mold and partially cures the binder. The core or mold then has sufficient structural integrity to withstand the substantially delivered higher volume flow, which is required for more rapid curing, without eroding.

The pressure control system can also include a bleed system which provides a low volume flow of gas through the heat exchanger continuously while the heating means is operating. This bleed keeps the heating member cooled and prevents it from becoming overheated between operating cycles. The heated bleed gas stream can be continuously flowed through hardware connecting the heater to the article being heated, such as to the core boxes in which cores are molded, thereby keeping the heat exchanger and connecting hardware warm so that the warm up time at the start of each heating cycle is minimized.

Preferably, the heater also includes means for automatically controlling the operation of the heating means, so that the heated gas delivered is maintained at a predetermined temperature, and means for automatically controlling the duration of the heating cycle.

Thus, the heater of this invention, although simply arranged to minimize fabrication costs, efficiently heats a pressurized gas and delivers heated gas in a manner whereby sand cores or mold containing an organic thermosetting binder material can be rapidly cured. Since the pressurized gas is expanded to a lower pressure before heating by the pressure control system, the efficiency of the heat exchanger is maximized. By sequentially regulating the volume of heated gas delivered by the heater, cores or molds can be rapidly cured with a pressurized gas without erosion damage.

DESCRIPTION OF THE PREFERRED EMBODIMENTS

Figure 1:
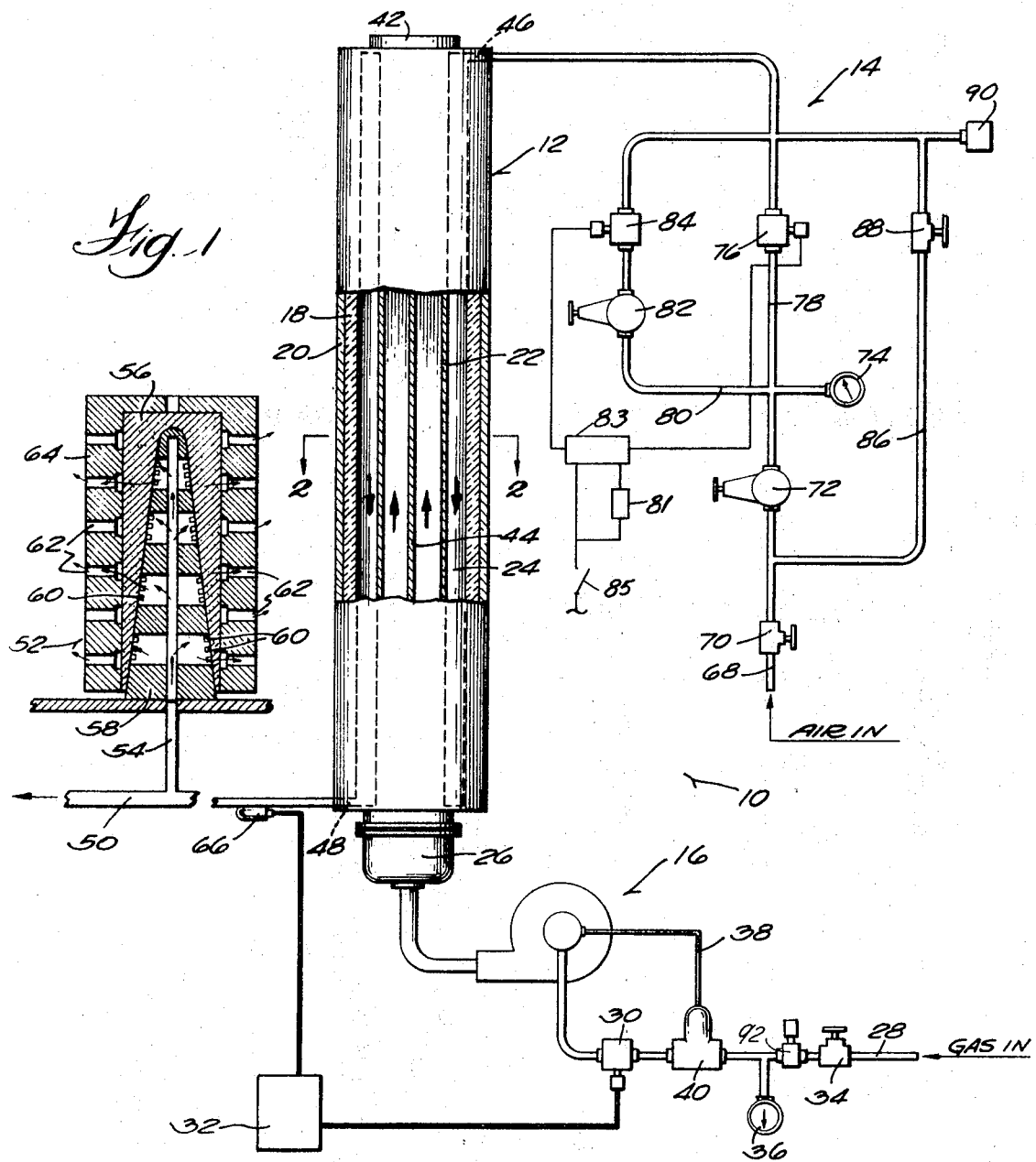
FIG. 1 is a side elevational view, partially in diagrammatic, of a heater embodied by this invention shown connected to a foundry core box.

Heater 10 includes a heat exchanger 12, a pressure regulation system 14 and a heating system 16. Heat exchanger 12 has an elongated, tubular shell 18 surrounded by a thermal-insulating cover 20 and an elongated, tubular flue 22, which is constructed from a heat conductive material and is concentrically located with respect to housing 18 to provide an annular flow passage 24 therebetween.

Heating system 16 includes a conventional gas burner 26 connected to the lower end of flue 22. Flow of a combustible gas, such as natural gas, supplied to burner 26 through supply conduit 28, is controlled by solenoid-operated valve 30. Valve 30 is manipulated by a conventional temperature controller 32, such as Partlow Temperature Controller MF-2. Plug cock 34 regulates the flow rate of the gas through supply conduit 28 and also acts as a main shut off means for the gas supply system. The pressure of the gas in the supply conduit 28 is indicated on pressure gauge 36. As a safety feature, a conventional ignition control assembly 38 is provided to automatically shut off the gas flow to burner 26 in the event that the burner pilot light is extinguished. The ignition control assembly includes a thermal sensing means (not shown) sensing the pilot light flame and a shut off valve 40 in supply conduit 28 which, in response to a signal initiated by the sensing means indicating the pilot light flame has extinguished, is actuated to the closed position.

Figure 2:
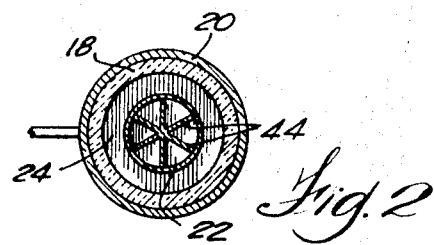
FIG. 2 is a sectional view taken along the plane designated 2—2 in FIG. 1.

Hot combustion gases produced by burner 26 heat the outer surface of flue 22 as they rise upwardly therethrough and are exhausted through chimney 42. As shown in FIG. 2, flue 22 has a plurality of radial fins 44, which extend along the length of the flue. These fins act to uniformly distribute the flow of the hot combustion gases so that the outer surface of flue 22 is uniformly heated.

Compressed air, the pressure which is controlled by pressure regulation system 14 as described below, is introduced into the top portion of the heat exchanger 12 through inlet 46 and flows downwardly through annular flow passage 24. The air is heated as it flows in contact with the heated outer surface of flue 22. The heated air exits from the lower portion of heat exchanger 12 through outlet 48 and flows into manifold 50, which is connected to a plurality of foundry core boxes 52 (one of which is shown) by separate conduits 54.

Each core box 52 contains an uncured foundry core 56 or mold which has been formed therein. Core 56 is formed from a mixture of a major portion of moist sand and a minor portion of an organic thermosetting resin which acts as a binder for the sand. The organic thermosetting resin is any of the conventional so-called hot box binders, such as an urea modified phenolic resin, which can be cured to a hardened state by the application of heat.

Conduit 54 is connected to mandrel 58 positioned in box 52. The heated air enters into mandrel 58, passes through pressure ports 60, flows through core 56 and is exhausted through a plurality of vent ports 62 provided in mold cavity housing 64. As the heated air passes through the core, the binder material is cured. After the heated air has passed through the core for a sufficient time for the binder to cure to a hardened state, the air flow is shut off and the completed core is removed from the core box.

The temperature of the heat air flow through core 56 depends primarily upon the type and amount of binder material used. Generally, the temperature required to cure the binder material can vary over a range of about 50° to 300° F. The temperature of the heated air is maintained at a predetermined level by controlling the flow of gas to burner 26 through supply conduit 28. Valve 30 is energized open and closed, as required, by temperature controller 32 responsive to a thermal sensing means 66, such as a thermocouple, which senses the temperature of the heated air in outlet 48. Temperature controller 32 is adjusted to a setting corresponding to the temperature required to cure the particular type and amount of binder being used in the core within the desired time period.

Since the sand cores are very vulnerable to erosion by the air flow prior to the curing of the binding material, pressure regulation system 14 is arranged to provide an initial air flow of a low velocity and pressure to effect a partial curing, followed by an air flow at a higher velocity and pressure to effect the desired curing rate. Compressed air at about 100 p.s.i. is introduced into pressure regulation system 14 through supply conduct 68 via main shut off valve 70. Regulator 72 is adjusted to provide the desired pressure of the air supply during the main operating stage, which is indicated on pressure gauge 74. Solenoid-operated shut off valve 76 controls the flow of air through conduit 78. Air for the initial heating stage flows through by-pass conduit 80. The volume of the by-pass air is adjusted by valve 82, with the flow being controlled by solenoid-operated shut off valve 84.

Solenoid-operated valves 76 and 84 are connected into an electrical control (represented diagrammatically in FIG. 1) which includes two timers represented by blocks 81 and 83, an on-off switch 85 and appropriate interconnecting circuitry. Conventional electrical components and well-known circuitry are employed in the electrical control system to perform the desired functions. Therefore, details of the electrical control system will not be described for the sake of brevity. Upon actuation of the on-off switch 85 to the "on" position, valve 84 is energized to the open position, while valve 76 remains closed, and compressed air flows through by-pass conduit 80 via regulator 84 into passage 24 of heat exchanger 12 where it is heated as described above. The low pressure heated air flowing through core 56 effects a partial curing of the thermosetting core binder. Valve 82 is adjusted to provide an air flow through the core which will not cause erosion. This flow will vary depending on the size, shape, and composition of the core. For example, when the temperature of heated air is about 250° F, an air flow of about 30 to about 50 cubic feet per minute is usually sufficient for this purpose.

When the on-off switch 85 is actuated to the "on" position, both the timers 81 and 83 in the electrical control system start timing. Timer 81 controls the duration of the by-pass flow and timer 83 controls the total duration of the heating cycle. When the by-pass flow timer 81 runs out, valve 76 is energized to the open position and air, regulated by regulator 72, flows through conduit 78 into annular passage 24 of heat exchanger 12. Regulator 72 is adjusted to provide a flow of air through core 56 which will effect rapid curing of the thermosetting binder material. This air flow is varied depending upon the size, shape and composition of the core and specific type of binder used. As a guide, it has been found that a flow rate at manifold 50 of about 250 cubic feet per minute, with the heated air at a temperature of about 250° F, is sufficient for many different cores and hot box binders.

When the timer 83 in the electrical control system runs out, both valves 76 and 84 are energized to the closed position and flow of air through both by-pass conduit 80 and conduit 76 is shut off. As can be readily appreciated, the duration of the two timers is adjusted so that the by-pass flow and the main operating flow provide the desired partial curing and rapid curing of the binder, respectively. This duration depends upon such factors as the type and amount of the binder used, the temperature and pressure of the heated air used, the size and shape of the core, etc. Although longer or shorter durations can be used, a by-pass flow duration of about 2 to 15 seconds and a main operating flow duration of about 3 to about 55 seconds generally is adequate for many different types of cores. Valve 76 and 84 are also electrically connected to the on-off switch 85 so that they can be closed at any time by actuation of the switch to the "off" position.

A low volume air stream (e.g. about 20 cubic feet per minute), supplied through bleed conduit 86 via regulator 88, flows through annular passage 24 of the heat exchanger at all times while burner 26 is lit. This low volume bleed flows keeps flue 22 cooled so that it does not become overheated between operating cycles. It also keeps manifold 50, conduits 54, and other associated hardware warm so that the time required for the system to reach the operating temperature at the start of a heating cycle is minimized. Pressure switch 90, sensing the pressure in bleed conduit 86, is operatively connected solenoid-operated valve 92 in gas supply conduit 28 which controls the total gas flow. In the event the pressure in the bleed system drops below a predetermined minimum level, valves 30 and 92 are energized closed. This insures the gas supply to the main burner is shut off, thereby protecting the flue against overheating in case of a bleed system malfunction.

From the above detailed description of a preferred embodiment, it will be appreciated by those skilled in the art that alternations can be made thereto without departing from the spirit and scope of the invention. For instance, conventional electrical resistance heating means, either arranged to heat the surface of the flue or arranged to heat air circulated thereover by a fan or the like, can be used as the heating source in place of gas burner 26. Also, other means can be used in the pressure control system to sequentially regulate the flow of compressed air introduced into the heat exchanger. For example, a time-controlled valve having a dashpot arrangement can be used in place of valves 76, 82 and 84. Such a valve operates so that, upon the application of high pressure air, small volume flow initially passes through a vent and the dashpot is gradually overcome to open the main valve which admits a higher volume flow into flow passage 24. A butterfly valve mechanically linked to a Barber Coleman MK3140 Operator is a specific example of such a valve arrangement. Although less efficient, the heat exchanger can be arranged so the flue 22 circumscribes the tubular shell with the air flowing through the inside of the shell. Also, compressed gases, other than air can be used.

We claim:
1. Apparatus for heating a pressurized gas comprising heat exchanger having an elongated, tubular shell, a pressurized gas inlet and a heated gas outlet;
   a heating member disposed in said heat exchanger and arranged with respect to said shell to define a flow passage therebetween, said passage being in communication with said inlet and said outlet;
   means for heating said heating member so that pressurized gas flowing through said passage in contact with the surface of said heating member is heated thereby;
   a pressure control system for controlling and regulating the flow of said pressurized gas introduced into said flow passage through said inlet, said pressure control system including means for automatically sequencing the regulation of said flow so that the initial flow is at a relatively low volume and, after a predetermined time, is at a higher volume; and
   means for providing a low volume flow of gas through said passage at all times while said heating means is operating.

2. The apparatus according to claim 1 when said heating member comprises a tubular member extending substantially the length of said shell.

3. The apparatus according to claim 2 wherein said heating member includes means for producing hot gases which pass through the inside of said tubular member.

4. The apparatus according to claim 3 wherein said tubular member includes a plurality of radial fins for distributing the flow of said hot gases so that said tubular member is uniformly heated.

5. The apparatus according to claim 3 wherein said tubular member is positioned inside of and is concentric with said shell.

6. The apparatus according to claim 1 wherein said pressure control system comprises
   a first conduit means which is connected to said inlet and includes means for regulating the flow of said pressurized gas into said passage and a first flow shutoff means;
   second conduit means which is connected to said inlet and includes means for regulating the flow of said pressurized gas into said passage and a second flow shutoff means, said flow regulating means associated with said first conduit means providing a volume of flow of said gas therethrough which is substantially less than the volume of flow of said gas through said second conduit;
   means for opening said first flow shutoff means without opening said second flow shutoff means; and
   means for automatically opening said first flow shutoff means after said second flow shutoff means has been open for a predetermined time.

7. The apparatus according to claim 6 wherein said pressure control system further comprises third conduit means which is connected to said inlet and includes flow regulating means, said third conduit means and flow regulating means associated therewith being adapted to continuously introduce a low volume flow of said pressurized gas into said passage at all times while said heating means is operating.

8. Apparatus for heating a pressurized gas comprising a heat exchanger having an elongated, tubular shell, a pressurized gas inlet, and a heated gas outlet;
   a tubular member extending substantially the length of said shell and positioned inside said shell so as to define an annular flow passage therebetween with said passage being in communication with said inlet and said outlet;
   means for producing hot gases, which pass through the inside of and heat said tubular member, so that gas flowing through said passage in contact with the outer surface of said tubular member is heated thereby;
   first conduit means connected to said inlet for supplying a regulated flow of said pressurized gas through said passage said first conduit means including a first flow shutoff means;
   second conduit means connected to said inlet for supplying a regulated flow of said pressurized gas into said passage, said second conduit means including a second flow shutoff means and adapted to supply a volume of flow substantially less than that supplied by said first conduit means;

means for opening said first flow shutoff means without opening said second flow shutoff means; and
means for automatically opening said first flow shutoff means after said second flow shutoff means has been open for a predetermined time.

9. The apparatus according to claim 8 further comprising a third conduit means connected to said inlet which includes flow regulating means, said third conduit means and flow regulating means associated therewith being adapted to continuously introduce a low volume flow of said pressurized gas into said passage at all times while said heating means is operating.

* * * * *